US012751428B2

(12) United States Patent
Oerter et al.

(10) Patent No.: US 12,751,428 B2
(45) Date of Patent: Oct. 6, 2026

(54) POULTRY CRADLES AND METHODS OF RESTRAINING POULTRY

(71) Applicant: NOVA-TECH ENGINEERING, LLC, Willmar, MN (US)

(72) Inventors: Dominic Oerter, Sunburg, MN (US); Matthew H. Erickson, Spicer, MN (US); Nathan A. Blum, Cosmos, MN (US)

(73) Assignee: Nova-Tech Engineering, LLC, Willmar, MN (US)

( * ) Notice: Subject to any disclaimer, the term of this patent is extended or adjusted under 35 U.S.C. 154(b) by 215 days.

(21) Appl. No.: 18/701,380

(22) PCT Filed: Apr. 27, 2022

(86) PCT No.: PCT/US2022/026470

§ 371 (c)(1),
(2) Date: Apr. 15, 2024

(87) PCT Pub. No.: WO2023/075842

PCT Pub. Date: May 4, 2023

(65) Prior Publication Data

US 2024/0415100 A1 Dec. 19, 2024

Related U.S. Application Data

(60) Provisional application No. 63/273,430, filed on Oct. 29, 2021.

(51) Int. Cl.
*A01K 37/00* (2006.01)
*A61D 3/00* (2006.01)

(52) U.S. Cl.
CPC ................ *A01K 37/00* (2013.01); *A61D 3/00* (2013.01); *A61D 2003/003* (2013.01)

(58) Field of Classification Search
CPC ...... A01K 37/00; A01K 45/00; A01K 45/005; A01K 1/0613; A61D 1/005; A61D 3/00; A61D 2003/003; A61D 2003/006; A22C 21/0007; A22C 21/0046; A22C 21/0053
See application file for complete search history.

(56) References Cited

U.S. PATENT DOCUMENTS 3,286,694 A 11/1966 Landy
3,774,578 A 11/1973 Randolph et al.
4,003,341 A 1/1977 La Croix
(Continued)

FOREIGN PATENT DOCUMENTS

FR 2 848 410 6/2004
SU 1 342 492 10/1987
(Continued)

OTHER PUBLICATIONS

U.S. Appl. No. 61/146,732, filed Jan. 23, 2009, Gorans et al.
(Continued)

*Primary Examiner* — Robert A Lynch
(74) *Attorney, Agent, or Firm* — Mueting Raasch Group

(57) ABSTRACT

Poultry cradles and methods of restraining birds are disclosed. Each poultry cradle may include a torso support, one or more shank clamps, one or more optional shank guides, and a head support. Restraining the shanks of birds using separate shank clamps and optional shank guides can provide additional control over the shanks and, therefore, the toes, of the restrained birds.

17 Claims, 4 Drawing Sheets

(56) References Cited

U.S. PATENT DOCUMENTS

| | | | |
|---|---|---|---|
| 4,120,266 | A | 10/1978 | Oloff et al. |
| 4,502,418 | A | 3/1985 | Runyan |
| 4,693,212 | A | 9/1987 | Black |
| 5,195,925 | A | 3/1993 | Gorans |
| 5,267,778 | A | 12/1993 | Krebs et al. |
| 5,651,731 | A | 7/1997 | Gorans et al. |
| 5,823,146 | A | 10/1998 | Alaniz et al. |
| 7,066,112 | B2 | 6/2006 | Gorans |
| 7,146,936 | B2 | 12/2006 | Dazai et al. |
| 7,232,450 | B2 | 6/2007 | Gorans et al. |
| 7,363,881 | B2 | 4/2008 | Gorans et al. |
| 9,775,695 | B2 | 10/2017 | Erickson et al. |
| 9,808,328 | B2 | 11/2017 | Gorans |
| 10,278,797 | B2 | 5/2019 | Gorans |
| 11,166,797 | B2 | 11/2021 | Gorans |
| 2004/0143278 | A1 | 7/2004 | Gorans |
| 2005/0101937 | A1 | 5/2005 | Gorans |
| 2005/0115521 | A1 | 6/2005 | Gorans |
| 2006/0207519 | A1 | 9/2006 | Gorans |
| 2007/0079766 | A1 | 4/2007 | Park |
| 2011/0313409 | A1 | 12/2011 | Erickson |
| 2015/0289475 | A1 | 10/2015 | Stevenson |
| 2017/0265979 | A1 | 9/2017 | Erickson |

FOREIGN PATENT DOCUMENTS

| | | |
|---|---|---|
| WO | WO 2010/085718 | 7/2010 |
| WO | WO 2010/085719 | 7/2010 |
| WO | WO 2021/150842 | 7/2021 |

OTHER PUBLICATIONS

U.S. Appl. No. 13/142,997, filed Jun. 30, 2011, Erickson et al.

U.S. Appl. No. 15/609,580, filed May 31, 2017, Erickson et al.

PCT International Search Report and Written Opinion for PCT/US2022/026470 dated Jul. 27, 2022 (14 pages).

Preliminary Report on Patentability for PCT/US2022/026470 dated May 10, 2024 (9 pages).

International Search Report and Written Opinion issued in the PCT on Jul. 23, 2010 for PCT/US2010/021900; 8 pgs.

International Preliminary Report on Patentability issued in the PCT on Aug. 4, 2011 for PCT/US2010/021900; 5 pgs.

POULTRY CRADLES AND METHODS OF RESTRAINING POULTRY

RELATED APPLICATION

The application is a § 371 U.S. National Stage of International Application No. PCT/US2022/026470 filed 27 Apr. 2022, which claims the benefit under 35 U.S.C. § 119 of U.S. Provisional Application Ser. No. 63/273,430, filed 29 Oct. 2021, and titled POULTRY CRADLES AND METHODS OF RESTRAINING POULTRY, both of which are incorporated herein by reference in their entireties.

FIELD

Poultry cradles and methods of restraining poultry in the poultry cradles are described herein.

The processing of poultry may include activities such as sexing to determine gender, inoculating or otherwise medicating the birds, feeding the birds, weighing the birds, treating the beaks and/or claws of the birds (to, e.g., retard their growth), etc. Conventionally, birds are handled manually, i.e., individuals must physically hold the bird and either perform the process while holding the bird or load the bird into equipment in which one of the processes is performed.

In many cases, the birds may be restrained by their heads as described in, e.g., U.S. Pat. No. 5,651,731 (Gorans et al.) with the remainder of the bird being either manually restrained or unrestrained.

SUMMARY

Poultry cradles and methods of atraumatically restraining poultry in the poultry cradles are described herein. Each poultry cradle may preferably include a torso support, head support, head clamp, shank clamp, and shank guide.

The poultry cradles preferably restrain the shanks and heads of the birds while supporting their torsos. Restraining the shanks and the heads of the birds while supporting their torsos may produce a calming effect such that the birds may exhibit significantly reduced struggling in an attempt to free themselves from the poultry cradle.

Another potential advantage of restraining the shanks of birds at two different locations along the shank using both a shank guide and a shank clamp (in addition to supporting their torsos and restraining their heads) in place of restraining the legs of the birds above the shank (i.e., above the hock joint) is that the additional control over the shank offered by the separate shank guide and shank clamp provides additional control over their hock joints and toes (i.e., phalanges). That additional control over the shank and toes/phalanges may be needed when, for example, the claws of the birds are to be treated to retard and/or prevent growth of the claws.

In one or more embodiments in which the shank guide and the shank clamp are spaced apart by a distance of 4 millimeters or more, or, in some instances, 6 millimeters or more, further advantages may be provided where the birds are larger. For example, spacing the shank guide from the shank clamp by a distance of 4 millimeters or more may improve control over the shank of a duck or a turkey hatchling that would otherwise not be available in the absence of a shank guide and/or if the shank guide and the shank clamp were located closer to each other.

As used herein, the term "shank" refers to the portion of a bird's hind limb that contains the metatarsus and extends from the hock joint (sometimes referred to as the ankle joint) to the joints between the distal phalanges (sometimes referred to as the toes). The distal phalanges include the forward facing phalanges commonly identified as "phalanges II, III, and IV" with a proximal phalange located above/superior from the distal phalanges II, III, and IV and commonly referred to as "Phalange I" which generally faces in the rearward (dorsal) direction.

As used herein with respect to the restraint of live birds, the term "atraumatic restraint" (and variations thereof) means restraint that does not require puncturing the skin of the bird to restrain the bird.

Although the poultry cradles and methods described herein may be used with birds of any age, they may be particularly useful when used with hatchlings, where "hatchlings" are defined as young birds (e.g., chickens, ducks, turkeys, geese, etc.) with an age of one week or less.

In a first aspect, one or more embodiments of poultry cradles for atraumatic restraint of a live bird as described herein include: a torso support shaped to support and atraumatically retain the torso of a live bird restrained in the poultry cradle; a head support operably attached to the torso support and positioned to receive a head of a bird restrained in the poultry cradle with its chest supported against the torso support; a head clamp operably attached to the head support, wherein the head clamp and the head support cooperate to receive and atraumatically retain a head of a bird between the head clamp and the head support; a shank clamp operably attached to the torso support, the shank clamp positioned to receive and atraumatically retain a shank of a live bird restrained in the poultry cradle, wherein the shank clamp comprises an open configuration in which the shank can be positioned in the shank clamp and a closed configuration in which the shank is retained in the shank clamp; and an optional shank guide positioned between the shank clamp and the torso support, the shank guide restraining the shank of a live bird restrained in the poultry cradle from movement in the lateral and medial directions when the shank clamp is in the open configuration and the closed configuration.

In one or more embodiments of poultry cradles as described herein, a position of the shank guide relative to the torso support and the shank clamp is fixed.

In one or more embodiments of poultry cradles as described herein, a distance between an inferior/bottom side the shank clamp and an inferior/bottom side of the shank guide along a longitudinal (superior/inferior) axis extending through the head support and the torso support is 5 millimeters or more, 1 centimeter or more, or 2 centimeters or more.

In one or more embodiments of poultry cradles as described herein, a distance between an inferior/bottom side the shank clamp and an inferior/bottom side of the shank guide along a longitudinal (superior/inferior) axis extending through the head support and the torso support is 3 centimeters or less, 2 centimeters or less, or 1 centimeter or less.

In one or more embodiments of poultry cradles as described herein, the head support comprises: a first side facing the head of a bird restrained in the poultry cradle; a second side facing away from the head of a bird restrained in the poultry cradle; a beak receiving passage extending through the head support from on opening on the first side to an opening on the second side; and wherein the head support and the head clamp comprise: an open configuration in which the beak of a bird restrained in the poultry cradle can be moved into the beak receiving passage; and a closed configuration in which the head of a bird is retained by the head clamp and the head support such that at least a portion of the beak of the bird is located within the beak receiving passage and at least a portion of the beak of the bird is exposed proximate the opening of the beak receiving passage on the second side of the head support.

In one or more embodiments of poultry cradles as described herein, the shank clamp comprises a left shank clamp configured to receive a left shank of a live bird restrained in the poultry cradle and the shank guide comprises a left shank guide configured to receive a left shank of a live bird restrained in the poultry cradle, and wherein the poultry cradle comprises: a right shank clamp operably attached to the torso support, the right shank clamp positioned to receive and atraumatically retain a right shank of a live bird restrained in the poultry cradle, wherein the right shank clamp comprises an open configuration in which the right shank can be positioned in the right shank clamp and a closed configuration in which the right shank is retained in the right shank clamp; and an optional right shank guide positioned between the right shank clamp and the torso support, the right shank guide restraining the right shank of a live bird restrained in the poultry cradle from movement in the lateral and medial directions when the right shank clamp is in the open configuration and the closed configuration.

In a second aspect, one or more embodiments of methods of restraining a live bird in a poultry cradle as described herein include: positioning the torso of a live bird proximate a torso support of a poultry cradle, wherein the torso support is shaped to support and atraumatically retain the torso of the bird restrained in the poultry cradle; restraining the head of the bird against a head support operably attached to the torso support, wherein a head clamp is operably connected to the head support and cooperates with the head support to receive and atraumatically retain the head of a bird between the head clamp and the head support; and restraining the shank of a leg of the bird in a shank clamp and an optional shank guide, wherein the shank guide is located between the shank clamp and torso support, wherein the shank guide restrains movement of the shank in the lateral and medial directions when the shank clamp is in the open configuration and the closed configuration, wherein removal of the shank from the shank clamp is prevented when the shank is in the shank guide and the shank clamp, and the shank clamp is in a closed configuration.

In one or more embodiments of the methods of retraining a live bird in a poultry cradle as described herein, the shank restrained in the shank clamp and the shank guide is the left shank, and wherein the method comprises restraining a right shank of a right leg of the bird in a right shank clamp and an optional right shank guide, wherein the right shank guide is located between the right shank clamp and torso support, wherein the right shank guide restrains movement of the right shank in the lateral and medial directions when the right shank clamp is in the open configuration and the closed configuration, wherein removal of the right shank from the right shank clamp is prevented when the right shank is in the right shank guide and the right shank clamp, and the right shank clamp is in a closed configuration.

In one or more embodiments of the methods of retraining a live bird in a poultry cradle as described herein, a position of the shank guide relative to the torso support and the shank clamp is fixed.

In one or more embodiments of the methods of retraining a live bird in a poultry cradle as described herein, a distance between an inferior/bottom side the shank clamp and an inferior/bottom side of the shank guide along a longitudinal axis extending through the head support and the torso support is 5 millimeters or more, 1 centimeter or more, or 2 centimeters or more.

In one or more embodiments of the methods of retraining a live bird in a poultry cradle as described herein, a distance between an inferior/bottom side the shank clamp and an inferior/bottom side of the shank guide along a longitudinal axis extending through the head support and the torso support is 3 centimeters or less, 2 centimeters or less, or 1 centimeter or less.

In one or more embodiments of the methods of retraining a live bird in a poultry cradle as described herein, the method comprises exposing at least a portion of the beak of the bird proximate a second side of the head support; wherein the head support comprises a first side facing the head of the bird restrained in the poultry cradle and wherein the second side faces away from the head of the bird restrained in the poultry cradle, wherein the head support further comprises a beak receiving passage extending through the head support from an opening on the first side to an opening on the second side.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein, "a," "an," "the," "at least one," and "one or more" are used interchangeably. Thus, for example, a shank clamp may refer to one or more shank clamps unless otherwise indicated.

The term "and/or" means one or all of the listed elements or a combination of any two or more of the listed elements.

The above summary is not intended to describe each embodiment or every implementation of the present invention. Rather, a more complete understanding of the poultry cradles and methods described herein will become apparent and appreciated by reference to the following Description of Exemplary Embodiments and claims in view of the accompanying figures of the drawing.

BRIEF DESCRIPTION OF THE VIEWS OF THE DRAWING

The present invention will be further described with reference to the views of the drawing, wherein.

DESCRIPTION OF ILLUSTRATIVE EMBODIMENTS

Figure 1:
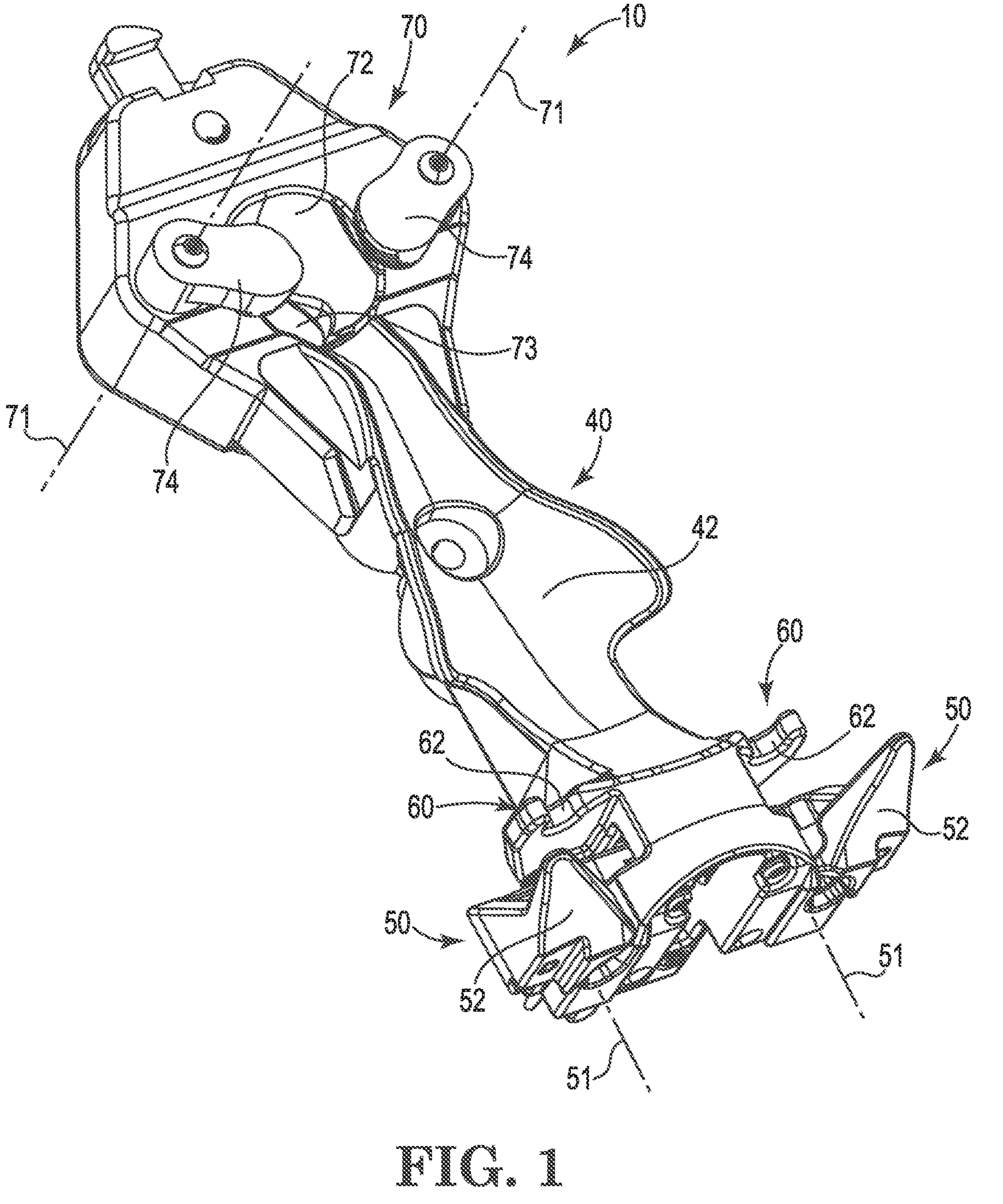
FIG. 1 is a perspective view of one illustrative embodiment of a poultry cradle as described herein.

In the following detailed description of exemplary embodiments, reference is made to the accompanying figures of the drawing which form a part hereof, and in which are shown, by way of illustration, specific embodiments in which the poultry cradles and methods described herein may be practiced. It is to be understood that other embodiments may be utilized and structural changes may be made without departing from the scope of the present invention.

As described herein, the poultry cradles of the present invention may include a variety of features designed to assist in the transport and/or processing of the restrained birds in, for example, processing systems such as those described in U.S. Pat. No. 7,066,112, titled AUTOMATED POULTRY PROCESSING METHOD AND SYSTEM. The poultry cradles of the present invention may also be used in other systems or environments where transport and/or processing of birds is performed.

Figure 2:
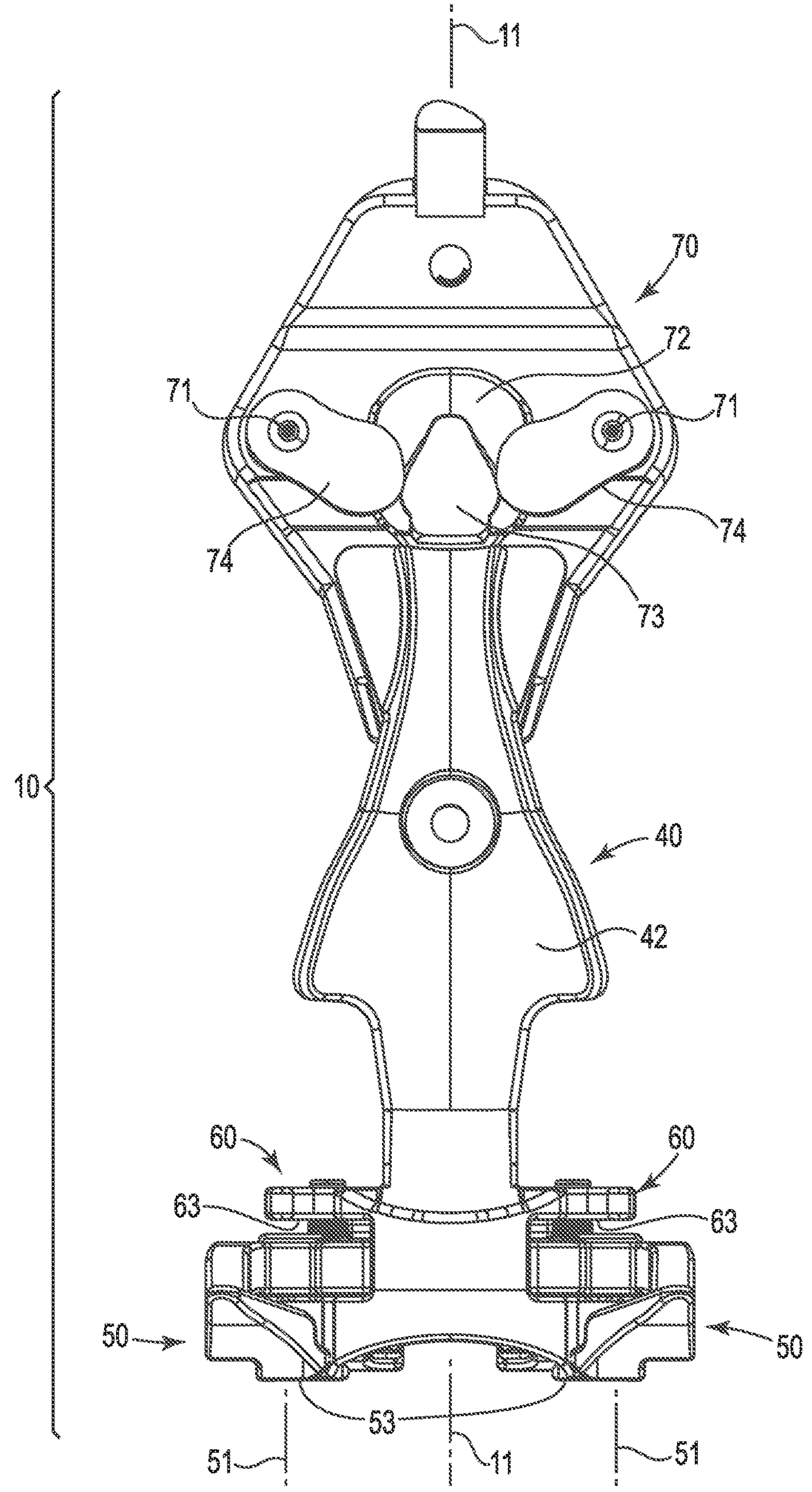
FIG. 2 is front plan view of the poultry cradle of FIG. 1.
Figure 3:
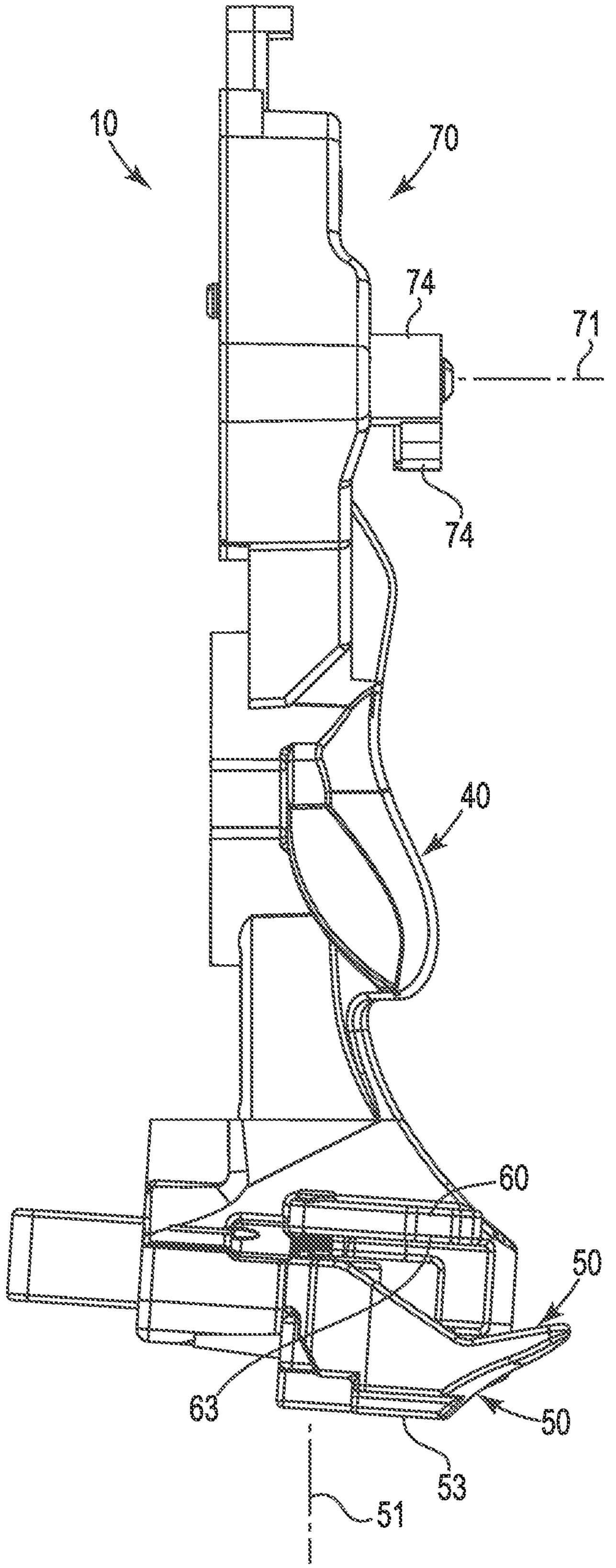
FIG. 3 is a side plan view of the poultry cradle of FIG. 1.

One exemplary embodiment of a poultry cradle according to the principles of the present invention is depicted in the perspective view of FIG. 1, a front plan view in FIG. 2, and a side plan view in FIG. 3. The end of the poultry cradle is depicted in an enlarged view in FIG. 4. The depicted poultry cradle 10 includes a torso support 40, a pair of shank control apparatus each including a shank clamp 50 and shank guide 60, and an optional head support 70. The various components may be operably attached in a manner that provides for atraumatic restraint of a bird positioned in the poultry cradle 10.

In one or more embodiments, the torso support 40 includes a support surface 42 shaped to generally follow the anatomical shape of the torso of a bird located in the poultry cradle 10 such that the torso of the bird is generally evenly supported. As a result, the shape of the support surface 42 may be different depending on the breed, age, gender, etc. of the birds that are to be restrained in the poultry cradle 10. The torso support 40 may include one or more openings to expose the torso provide access to the abdomen of a bird positioned thereon such that various activities such as, e.g., injections, monitoring, etc. may be performed while the bird is atraumatically retained in the poultry cradle 10.

The shank control apparatus are provided and positioned to restrain the shanks of a bird having its torso supported by the torso support 40. Each shank control apparatus includes a shank clamp 50 positioned to retain a shank of a bird at a location below the joint commonly referred to as the "hock" joint and above the joints of the forward-facing toes at the inferior end of the shank, while the optional shank guide 60 is positioned to act on the shank above or superior to the shank clamp 50.

While the shank clamps 50 prevent the bird from moving its shank in any direction other than along the length of its shank, the depicted illustrative embodiments of optional shank guides 60 assist in preventing movement of the shanks contained therein along the lateral and medial directions of the restrained bird. The optional shank guides 60 include a slot 62 configured to receive a shank of bird positioned in the shank clamp 50 located below/inferior to the shank guide 60. Because the optional shank guide is in the form of a slot 62, the shank guide 60 alone cannot restrain movement of a shank of a restrained bird in the dorsal direction.

The combined two-point restraint of the shanks by the shank clamps 50 and optional shank guides 60 (in addition to supporting their torsos and restraining their heads) provides additional control over their hock joints at the proximal/superior ends of the shanks and the toes (i.e., phalanges) located at the distal/inferior ends of the shanks. That additional control over the shanks and toes/phalanges may be needed when, for example, the claws of the birds are to be treated to retard and/or prevent growth of the claws.

Figure 4:
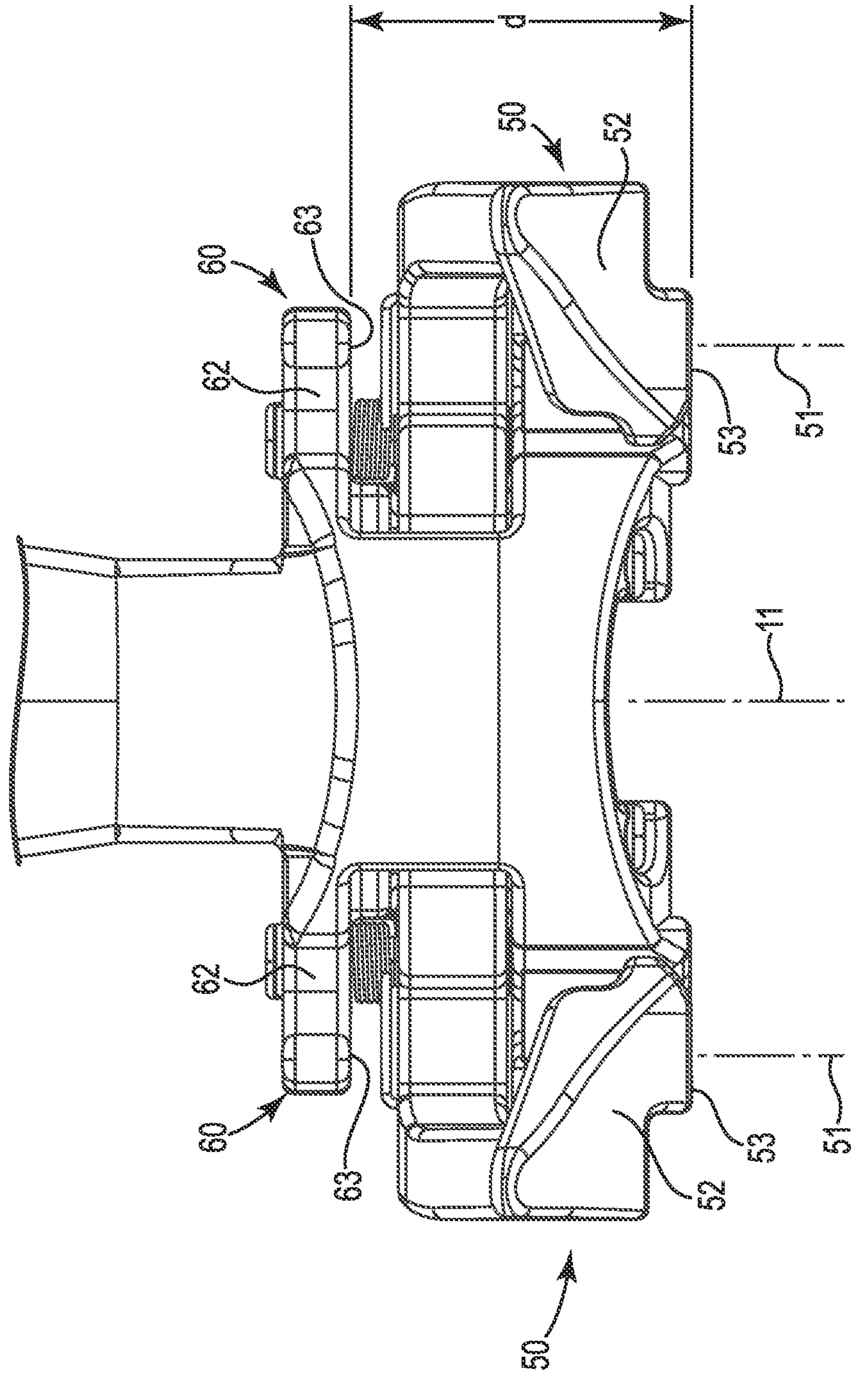
FIG. 4 is an enlarged view of the shank guides and shank clamps of the poultry cradle of FIG. 1.

Spacing between the inferior/bottom side 53 of the shank clamps 50 and the inferior/bottom side 63 of the shank guides 60 may be helpful for larger birds. With reference to FIG. 4, the spacing d between the inferior/bottom side 63 of the shank clamp 50 from the inferior/bottom side 63 of the shank guide 60 may improve control over the shank of a duck or a turkey hatchling that would otherwise not be available in the absence of a shank guide and/or if the shank guide and the shank clamp were located closer to each other.

In one or more embodiments, the distance between an inferior/bottom side 53 of the shank clamp 50 and the inferior/bottom side 63 of the shank guide 60 along a longitudinal (superior/inferior) axis 11 extending through the head support 70 and the torso support 40 is, at a lower end, 5 millimeters or more, 1 centimeter or more, or 2 centimeters or more.

In one or more embodiments, the distance between an inferior/bottom side 53 of the shank clamp 50 and the inferior/bottom side 63 of the shank guide 60 along a longitudinal (superior/inferior) axis 11 extending through the head support 70 and the torso support 40 is, at an upper end, 3 centimeters or less, 2 centimeters or less, or 1 centimeter or less.

In one or more embodiments, the shank clamps 50 may include arms 52 that move between open configurations in which the shanks of a bird can be positioned in the shank clamps 50 and closed configurations in which the shanks of the bird are retained in the shank clamps 50. Although the depicted shank clamps 50 include arms 52, other structures (such as, e.g., inflatable bladders, etc.) may be used to retain a bird's shanks in the shank clamps when the clamps 50 are in the closed configuration.

The shank clamps 50 may be normally closed but constructed such that they open in response to the forces generated as a shank is being inserted into the shank clamp 50 (the shank clamps 50 may be, e.g., spring-loaded, etc.). In other embodiments, the shank clamps 50 may have defined open and closed configurations between which the clamps can be moved to accept and/or retain a shank of a bird being restrained. In one or more embodiments, the arms 52 of the shank clamps may rotate about clamp axes 51 when moving between the open and closed configurations.

The poultry cradles 10 may also include a head support 70 operably attached to the torso support 40 and positioned to support the head of a bird located in the poultry cradle 10. The head support 70 includes a first side facing the head of a bird retained in the poultry cradle. The head support 70 may preferably include a beak receiving passage 72 extending through the head support 70 to an opening 73 on the second side of the head support 70. The beak receiving passage 72 preferably extends through the head support 70 such that at least a portion of the beak of a bird retained in the poultry cradle 10 extends through the opening 73 of the beak receiving passage 72 and is exposed proximate the second surface of the head support 70 (where the second side of the head support 70 faces away from the head of a bird retained in the poultry cradle 10).

The head support 70 may include head clamps 74 movable between an open configuration and a closed configuration. In the open configuration, the head clamp 74 is preferably positioned such that the head of a bird can be positioned in the head support 70 with the beak preferably extending through the beak receiving passage 72 and preferably protruding from the opening 73 on the second side of the head support 70. In the closed configuration, the head clamps 74 preferably function to retain the head of a bird in the head support 70 such that its beak extends into the beak receiving passage 72 and preferably protrudes through the opening 73 on the second side of the head support. The head clamps 74 may rotate about head clamp axes 71 when moving between their open and closed configurations.

Structures similar to the head support 70 and related components may be described in, e.g., U.S. Pat. No. 5,651, 731 titled METHOD AND APPARATUS FOR DEBEAKING POULTRY; U.S. Pat. No. 7,232,450 titled APPARATUS AND METHOD FOR UPPER AND LOWER BEAK TREATMENT; U.S. Patent Application Publication US 2005/0101937 A1 titled APPARATUS AND METHOD FOR NASAL DELIVERY OF COMPOSITIONS TO BIRDS; U.S. Pat. No. 7,363,881 titled BEAK TREATMENT WITH TONGUE PROTECTION; etc.

The poultry cradles and related components may be manufactured of any suitable materials, e.g., metals, plastics, etc. In some instances, it may be beneficial if the materials have selected physical characteristics, such as, e.g., electrical conductivity, thermal conductivity, etc.

The complete disclosure of the patents, patent documents, and publications cited in the Background, the Description of Exemplary Embodiments, and elsewhere herein are incorporated by reference in their entirety as if each were individually incorporated.

Exemplary embodiments of the poultry cradles and methods described herein have been discussed and reference has been made to possible variations. These and other variations and modifications will be apparent to those skilled in the art without departing from the scope of the invention, and it should be understood that this invention is not limited to the illustrative embodiments set forth herein. Accordingly, the invention is to be limited only by the claims provided below and equivalents thereof.

The invention claimed is:

1. A poultry cradle for atraumatic restraint of a live bird, the poultry cradle comprising:

a torso support shaped to support and atraumatically retain the torso of a live bird restrained in the poultry cradle;

a head support operably attached to the torso support and positioned to receive a head of a bird restrained in the poultry cradle with its chest supported against the torso support;

a head clamp operably attached to the head support, wherein the head clamp and the head support cooperate to receive and atraumatically retain a head of a bird between the head clamp and the head support;

a shank clamp operably attached to the torso support, the shank clamp positioned to receive and atraumatically retain a shank of a live bird restrained in the poultry cradle, wherein the shank clamp comprises an open configuration in which the shank can be positioned in the shank clamp and a closed configuration in which the shank is retained in the shank clamp; and a shank guide positioned between the shank clamp and the torso support, the shank guide restraining the shank of a live bird restrained in the poultry cradle from movement in the lateral and medial directions when the shank clamp is in the open configuration and the closed configuration.

2. The poultry cradle according to claim 1, wherein a position of the shank guide relative to the torso support and the shank clamp is fixed.

3. The poultry cradle according to claim 1, wherein a distance between an inferior/bottom side of the shank clamp and an inferior/bottom side of the shank guide along a longitudinal (superior/inferior) axis extending through the head support and the torso support is 5 millimeters or more.

4. The poultry cradle according to claim 1, wherein a distance between an inferior/bottom side of the shank clamp and an inferior/bottom side of the shank guide along a longitudinal (superior/inferior) axis extending through the head support and the torso support is 3 centimeters or less.

5. The poultry cradle according to claim 1, wherein the head support comprises:

a first side facing the head of a bird restrained in the poultry cradle;

a second side facing away from the head of a bird restrained in the poultry cradle;

a beak receiving passage extending through the head support from an opening on the first side to an opening on the second side;

and wherein the head support and the head clamp comprise:

an open configuration in which the beak of a bird restrained in the poultry cradle can be moved into the beak receiving passage; and a closed configuration in which the head of a bird is retained by the head clamp and the head support such that at least a portion of the beak of the bird is located within the beak receiving passage and at least a portion of the beak of the bird is exposed proximate the opening of the beak receiving passage on the second side of the head support.

6. The poultry cradle according to claim 1, wherein the shank clamp comprises a left shank clamp configured to receive a left shank of a live bird restrained in the poultry cradle and the shank guide comprises a left shank guide configured to receive a left shank of a live bird restrained in the poultry cradle, and wherein the poultry cradle comprises:

a right shank clamp operably attached to the torso support, the right shank clamp positioned to receive and atraumatically retain a right shank of a live bird restrained in the poultry cradle, wherein the right shank clamp comprises an open configuration in which the right shank can be positioned in the right shank clamp and a closed configuration in which the right shank is retained in the right shank clamp; and a right shank guide positioned between the right shank clamp and the torso support, the right shank guide restraining the right shank of a live bird restrained in the poultry cradle from movement in the lateral and medial directions when the right shank clamp is in the open configuration and the closed configuration.

7. A method of restraining a live bird in a poultry cradle, the method comprising:

positioning the torso of a live bird proximate a torso support of a poultry cradle, wherein the torso support is shaped to support and atraumatically retain the torso of the bird restrained in the poultry cradle;

restraining the head of the bird against a head support operably attached to the torso support, wherein a head clamp is operably connected to the head support and cooperates with the head support to receive and atraumatically retain the head of a bird between the head clamp and the head support; and restraining the shank of a leg of the bird in a shank clamp and a shank guide, wherein the shank guide is located between the shank clamp and torso support, wherein the shank guide restrains movement of the shank in the lateral and medial directions when the shank clamp is in an open configuration and a closed configuration, wherein removal of the shank from the shank clamp is prevented when the shank is in the shank guide and the shank clamp, and the shank clamp is in the closed configuration.

8. The method according to claim 7, wherein the shank restrained in the shank clamp and the shank guide is the left shank, and wherein the method comprises restraining a right shank of a right leg of the bird in a right shank clamp and a right shank guide, wherein the right shank guide is located between the right shank clamp and torso support, wherein the right shank guide restrains movement of the right shank in the lateral and medial directions when the right shank clamp is in the open configuration and the closed configuration, wherein removal of the right shank from the right shank clamp is prevented when the right shank is in the right shank guide and the right shank clamp, and the right shank clamp is in the closed configuration.

9. The method according to claim 7, wherein a position of the shank guide relative to the torso support and the shank clamp is fixed.

10. The method according to claim 7, wherein a distance between an inferior/bottom side of the shank clamp and an inferior/bottom side of the shank guide along a longitudinal axis extending through the head support and the torso support is 5 millimeters or more.

11. The method according to claim 7, wherein a distance between an inferior/bottom side of the shank clamp and an inferior/bottom side of the shank guide along a longitudinal axis extending through the head support and the torso support is 3 centimeters or less.

12. The method according to claim 7, wherein the method comprises exposing at least a portion of the beak of the bird proximate a second side of the head support;

wherein the head support comprises a first side facing the head of the bird restrained in the poultry cradle and wherein the second side faces away from the head of the bird restrained in the poultry cradle, wherein the head support further comprises a beak receiving passage extending through the head support from an opening on the first side to an opening on the second side.

13. The method according to claim 7, wherein a position of the shank guide relative to the torso support and the shank clamp is fixed;

and wherein a distance between an inferior/bottom side of the shank clamp and an inferior/bottom side of the shank guide along a longitudinal axis extending through the head support and the torso support is 5 millimeters or more.

14. The method according to claim 13, wherein a distance between an inferior/bottom side of the shank clamp and an inferior/bottom side of the shank guide along a longitudinal axis extending through the head support and the torso support is 3 centimeters or less.

15. A poultry cradle for atraumatic restraint of a live bird, the poultry cradle comprising:

a torso support shaped to support and atraumatically retain the torso of a live bird restrained in the poultry cradle;

a head support operably attached to the torso support and positioned to receive a head of a bird restrained in the poultry cradle with its chest supported against the torso support;

a head clamp operably attached to the head support, wherein the head clamp and the head support cooperate to receive and atraumatically retain a head of a bird between the head clamp and the head support;

a shank clamp operably attached to the torso support, the shank clamp positioned to receive and atraumatically retain a shank of a live bird restrained in the poultry cradle, wherein the shank clamp comprises an open configuration in which the shank can be positioned in the shank clamp and a closed configuration in which the shank is retained in the shank clamp; and a shank guide positioned between the shank clamp and the torso support, the shank guide restraining the shank of a live bird restrained in the poultry cradle from movement in the lateral and medial directions when the shank clamp is in the open configuration and the closed configuration;

wherein a position of the shank guide relative to the torso support and the shank clamp is fixed;

wherein a distance between an inferior/bottom side of the shank clamp and an inferior/bottom side of the shank guide along a longitudinal (superior/inferior) axis extending through the head support and the torso support is 5 millimeters or more.

16. The poultry cradle according to claim 15, wherein the distance between the inferior/bottom side of the shank clamp and the inferior/bottom side of the shank guide along the longitudinal (superior/inferior) axis extending through the head support and the torso support is 3 centimeters or less.

17. The poultry cradle according to claim 15, wherein the head support comprises:

a first side facing the head of a bird restrained in the poultry cradle;

a second side facing away from the head of a bird restrained in the poultry cradle;

a beak receiving passage extending through the head support from an opening on the first side to an opening on the second side;

and wherein the head support and the head clamp comprise:

an open configuration in which the beak of a bird restrained in the poultry cradle can be moved into the beak receiving passage; and a closed configuration in which the head of a bird is retained by the head clamp and the head support such that at least a portion of the beak of the bird is located within the beak receiving passage and at least a portion of the beak of the bird is exposed proximate the opening of the beak receiving passage on the second side of the head support.

* * * * *